3,231,572
3-SUBSTITUTED-4-QUINAZOLONES
Shin Hayao, Elkhart, Ind., assignor to Miles Laboratories, Inc., Elkhart, Ind., a corporation of Indiana
No Drawing. Filed Aug. 5, 1963, Ser. No. 300,085
10 Claims. (Cl. 260—256.4)

This invention relates to substituted quinazolones. More particularly, this invention relates to quinazolones which are substituted in the 3-position with a nitrogen containing moiety. In one of its more particular aspects, this invention relates to 2-alkyl or 2-aryl, 3-ω-substituted alkyl heterocyclic compounds having the following general formula:

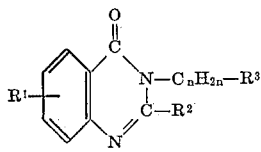

In the above structural formula, $R^1$ represents hydrogen or halogen, $R^2$ represents hydrogen, lower alkyl or aryl, $n$ represents a number from 0 to 7 and $R^3$ represents a phenyl substituted nitrogen heterocyclic radical. In a preferred subgroup of compounds $R^1$ is hydrogen or chloro, $R^2$ is hydrogen, methyl or phenyl and $R^3$ is phenyl substituted piperazyl or phenyl substituted piperidyl. These compounds may conveniently be prepared by reacting a substituted benzoxazine with an ω-aminoalkyl nitrogen heterocycle according to the following equation:

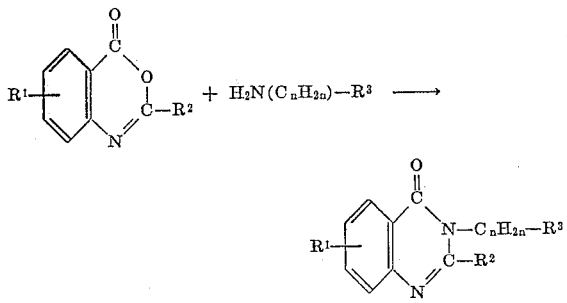

The reactants are heated together in order to produce a crystalline reaction product which is suitably in the form of a water soluble salt of the quinazolone derivative. The hydrochloride salt or other non-toxic salts, for example, the trihydrochloride-monomethanolate, oxalate or maleate may be isolated by the use of appropriate reagents. Quaternary salts such as the methiodide may also be prepared if desired. The free base may be liberated from the salt by treatment with aqueous sodium hydroxide or other alkali.

The quinazolone derivatives of this invention are useful as anti-inflammatory or sedative agents. They may be furnished in the form of various non-toxic salts for ease of administration.

The invention will be better understood by reference to the following examples, which are included for purposes of illustration and are not to be construed as in any way limiting the scope of this invention which is as defined in the claims appended hereto.

EXAMPLE 1
*2-methyl-3-[3-(4-phenyl-1-piperazyl)propyl]-4-quinazolone*

A mixture of 2-methyl-4-oxo-3,1,4H-benzoxazine (16.1 g., 0.1 mole) and 1-phenyl-4-(3-aminopropyl)piperazine (21.9 g., 0.1 mole) was heated at 175–180° in a wax bath for an hour to give an amber syrup. It was dissolved in methanol and saturated with dry hydrogen chloride to give a hydrochloride which came out from the hot solution, yield 36.8 g., M.P. 246–247° (dec.). It was dissolved in hot aqueous methanol, treated with dry hydrogen chloride to give a pure trihydrochloride monomethanolate, M.P. 250–251° (dec.), yield 32.9 g.

$\lambda_{max}^{KBr}$: 5.80μ (amide carbonyl)

*Analysis.*—Calcd. for $C_{22}H_{26}N_4O \cdot 3HCl \cdot CH_3OH$: HCl, 21.8. Found: HCl, 21.6.

A sample (5 g.) was dissolved in water and the free base was liberated with aqueous sodium hydroxide, yield 3.9 g., M.P. 95–101°. It was recrystallized from aqueous acetone to give needles of M.P. 104–105°, $\lambda_{max}^{CHCl_3}$: 5.93 (amide carbonyl)

*Analysis.*—Calcd. for $C_{22}H_{26}N_4O$: N, 15.5. Found: N, 15.4.

EXAMPLE 2
*2-methyl-3-[5-(4-phenyl-1-piperazyl)pentyl]-4-quinazolone*

A mixture of 2-methyl-4-oxo-3,1,4H-benzoxazine (10.1 g., 0.1 mole) and 1-phenyl-4-(5-aminopentyl)piperazine (24.7 g., 0.1 mole) was heated at 195–200° in a wax bath for 3 hours in dry nitrogen atmosphere to give a light amber syrup. It was dissolved in methanol, saturated with dry hydrogen chloride and diluted with ethyl acetate to give a hydrochloride on scratching. The solid was collected by suction, washed with ethyl acetate-ether, yield 48.1 g., M.P. 150–160° (dec.). It was dissolved in water and the free base was liberated, yield 37.3 g., M.P. 76–81°. It was recrystallized from aqueous acetone to give a colorless solid of M.P. 83–85°, yield 29.7 g. It was dissolved in 250 ml. of hot methanol, treated with dry hydrogen chloride to give a colorless solid of M.P. 170–172°, yield 32.9 g.

*Analysis.*—Calcd. for $C_{24}H_{30}N_4O \cdot 3HCl$: HCl, 21.9. Found: HCl, 22.0.

EXAMPLE 3
*2-methyl-3-[7-(4-phenyl-1-piperazyl)heptyl]-4-quinazolone*

A mixture of 2-methyl-4-oxo-3,1,4H-benzoxazine (16.1 g., 0.1 mole) and 1-phenyl-4-(7-aminoheptyl)-piperazine (27.5 g., 0.1 mole) was heated in a wax bath at 195–200° for 2 hours to give a dark melt. It was dissolved in 200 ml. of methanol, saturated with dry hydrogen chloride and diluted with ethyl acetate-ether to give a light gray hydrochloride. It was recrystallized twice from methanol-ether to give a white solid of M.P. 210–220°, yield 29.2 g. It was dissolved in water and made alkaline to give a solid free base. A small sample was dried at 60° (0.1 mm.) before analysis, $\lambda_{max}^{CHCl_3}$: 5.98μ (amide carbonyl)

M.P. ca. 75°.

*Analysis.*—Calcd. for $C_{26}H_{34}N_4O$: N, 13.4. Found: N, 13.1.

The free base (15.9 g.) was dissolved in warm methanol, filtered and treated with dry hydrogen chloride. The hot solution was diluted with ethyl acetate-ether to give a colorless solid on scratching. The trihydrochloride melted at 215–218° (dec.), yield 18.0 g.

*Analysis.*—Calcd. for $C_{26}H_{34}N_4O \cdot 3HCl$: HCl, 20.8. Found: HCl, 20.6.

EXAMPLE 4
*2-methyl-3-[6-(4-phenyl-1-piperazyl)hexyl]-4-quinazolone dihydrochloride*

A mixture of 2 - methyl - 4 - oxo-3,1,4H-benzoxazine (16.1 g., 0.1 mole) and 1-phenyl-4-(6-aminohexyl)- piperazine (26.1 g., 0.1 mole) was heated at 180° for 3 hours in nitrogen atmosphere. The hot melt was dissolved in 2-propanol, saturated with dry hydrogen chloride and the resulting hydrochloride was collected on a filter, washed with ethyl acetate-ether and dried in a vacuum dessicator, yield 49.1 g. (95.5%), M.P. 263–266° (dec.). It was dissolved in aqueous methanol, saturated with dry hydrogen chloride, filtered and diluted with ether to give a colorless powder on scratching, yield 34.1 g., M.P. 265–268° (dec.).

*Analysis.*—Calcd. for $C_{25}H_{32}N_4O \cdot 2HCl$: HCl, 15.4. Found: HCl, 15.7.

EXAMPLE 5

2-methyl-3-[3-(4-o-chlorophenyl-1-piperazyl)-propyl]-4-quinazolone oxalate

A mixture of the above benzoxazine (16.1 g., 0.1 mole) and 1-o-chlorophenyl-4-(3-aminopropyl)piperazine (25.4 g., 0.1 mole) was heated at 200–205° (a wax bath) for 3 hours to give a dark brown melt which was distilled to obtain an amber colored viscous liquid of B.P. 246–260° (0.15–0.30 mm.), yield 35.3 g. (89%). It was dissolved in ethyl acetate and treated with anhydrous oxalic acid (9.0 g., 0.1 mole) to give a sticky solid which gradually solidified. The crude oxalate was recrystallized from aqueous ethanol-ether to give a tan powder of M.P. 181–187° (dec.), yield 22.5 g. It was again recrystallized to give a light tan solid of M.P. 187–189° (dec.) with softening and resolidifying at 140–145°.

*Analysis.*—Calcd. for $C_{22}H_{25}ClN_4O \cdot C_2H_2O_4$: N, 11.5. Found: N, 11.7.

EXAMPLE 6

2-methyl-3-(4-phenyl-1-piperazyl)-4-quinazolone dihydrochloride

When 1-amino-4-phenylpiperazine (44.4 g., 0.25 mole) and the above benzoxazine (40.3 g., 0.25 mole) were mixed a white solid mass was obtained with evolution of heat. It was heated at 200–210° (a wax bath) in nitrogen atmosphere for 3.5 hours to give a dark melt. It was dissolved in hot methanol, treated with charcoal (Nuchar), filtered and cooled to give a light tan crystalline solid, yield 33.9 g. A sample was recrystallized from aqueous methanol to give colorless plates of M.P. 135–136°.

*Analysis.*—Calcd. for $C_{19}H_{20}N_4O$: N, 17.5. Found: N, 17.42, 17.35.

The first filtrate was saturated with dry hydrogen chloride to give a light tan solid of M.P. 249–251° (dec.), yield 14.8 g. The crystalline free base was dissolved in hot methanol, treated with dry hydrogen chloride and the resulting solid was collected by suction, yield 37.0 g., M.P. 250–251° (dec.). Two crops of hydrochloride were combined and recrystallized three times from aqueous ethanolic hydrogen chloride (decolorizing carbon) to give a colorless crystalline solid of M.P. 251–252° (dec.), yield 41.1 g.

*Analysis.*—Calcd. for $C_{19}H_{20}N_4O \cdot 2HCl$: HCl, 18.6. Found: HCl, 18.3.

EXAMPLE 7

2-methyl-3-[3-(4-p-tolyl-1-piperazyl)propyl]-4-quinazolone trihydrochloride monomethanolate A mixture of 1-p-tolyl-4-(3-aminopropyl)piperazine (33.9 g., 0.146 mole) and 2-methyl-4-oxo-3,1,4H-benzoxazine (23.5 g., 0.146 mole) was heated at 195–200° in a wax bath for 3 hours in nitrogen atmosphere. The hot melt was dissolved in 200 ml. of methanol and added to 200 ml. of methanol saturated with dry hydrogen chloride (50.9 g., 0.139 mole) to give a dark hot solution. Ethyl acetate was added to give a light gray solid of M.P. 222–226° (dec.), yield, 69.5 g. It was recrystallized twice from aqueous methanolic hydrogen chloride to give a pale tan solid of M.P. 228–229° (dec.), yield 60.1 g.

*Analysis.*—Calcd. for $C_{23}H_{28}N_4O \cdot 3HCl \cdot CH_3OH$: HCl, 21.20. Found: HCl, 21.27.

The above hydrochloride was treated with sodium hydroxide solution and the solid free base was recrystallized from aqueous methanol to give needles of M.P. 132–133°.

*Analysis.*—Calcd. for $C_{23}H_{28}N_4O$: N, 14.9. Found: N, 14.7.

EXAMPLE 8

2-methyl-3-[3-(4-m-chlorophenyl-1-piperazyl)propyl]-4-quinazolone trihydrochloride A mixture of 1-m-chlorophenyl-4-(3-aminopropyl)piperazine (32.5 g., 0.128 mole) and 2-methyl-4-oxo-3,1,4H-benzoxazine (20.6 g., 0.128 mole) was heated in a wax bath at 190–195° for 3 hours in nitrogen atmosphere to give a light amber melt which was dissolved in hot methanol and added to 200 ml. of methanol saturated with dry hydrogen chloride to give a hot solution. Ethyl acetate was added to it to cause separation of a solid on scratching. It was collected by suction, washed with ethyl acetate-ether and dried in air, yield 55.2 g. (91.4%). It was once recrystallized from aqueous methanol containing hydrogen chloride to give a pale pink solid of M.P. 249–250°, yield 46.7 g., $\lambda_{max.}^{KCl}$: 5.80µ (amide C=O), 6.04 (C=N)

*Analysis.*—Calcd. for $C_{22}H_{25}ClN_4O \cdot 3HCl$: HCl, 21.6. Found: HCl, 21.5.

EXAMPLE 9

2-methyl-3-[3-(4-p-tolyl-1-piperazyl)propyl]-4-quinazolone methiodide.

2-methyl-3-[3-(4-p-tolyl-1-piperazyl)propyl]-4-quinazolone (22.1 g., 0.059 mole) was dissolved in 100 ml. of acetone and 30 ml. of methyl iodide was added. Chloroform (50 ml.) was added to clarify the solution which was refluxed for ca. 15 minutes to give a solid mass. It was collected, washed with ethyl acetate-ether and dried in air, yield 24.9 g., M.P. 253°. It was once recrystallized from aqueous methanol-ether to give shiny crystals of M.P. 252–253°, yield 19.1 g.

*Analysis.*—Calcd. for $C_{24}H_{31}IN_4O$: N, 10.8. Found: N, 10.9.

EXAMPLE 10

1-phenyl-4-[3-(2-amino-5-chlorobenzamido)propyl]-piperazine

A. A solution of 1-(3-aminopropyl)-4-phenyl-piperazine (87.6 g., 0.4 mole) in 100 ml. of benzene was added to 6-chloroisatoic anhydride (79.0 g., 0.4 mole) to give a vigorous reaction with evolution of carbon dioxide. The mixture was then heated on a steam bath for an hour and set aside overnight. About 250 ml. of ether was added to the mixture and a light tan solid was collected by suction, washed with ether and dried in air, yield 132.9 g. (92.8%), M.P. 148–150°. A sample was once recrystallized from aqueous DMF to give a colorless solid of M.P. 152–155°.

*Analysis.*—Calcd. for $C_{20}H_{25}ClN_4O$: N, 15.0. Found: N, 14.4.

2-methyl-3-[3(4-phenyl-1-piperazyl)propyl]-6-chloro-4-quinazolone

B. A solution of the above amine (25.0 g., 0.067 mole) in 100 ml. of acetic anhydride was refluxed for 2 hours to give an amber solution which was set aside overnight. The solvent was removed in vacuo at 100° and the remaining dark liquid was added to ice water and made basic with aqueous ammonia to give a dark oil which slowly solidified during 2 days period. It was collected, washed with water and dried at 50° in an oven, yield 21.6 g. It was dissolved in hot methanol, treated with dry hydrogen chloride to give a dark solution which gave a light tan solid of M.P. 193–195° (dec.), yield 22.8 g. It was recrystallized twice from aqueous methanolic hydrogen chloride to give a crystalline solid of M.P. 195–196° (dec.), yield 19.1 g.

*Analysis.*—Calcd. for $C_{22}H_{25}ClN_4O \cdot 3HCl \cdot CH_3OH$: N, 10.4; HCl, 20.3. Found: N, 10.3; HCl, 20.0.

A sample of the hydrochloride was treated with aqueous ammonia to give a colorless solid which was recrystallized from aqueous methanol to give shiny plates of M.P. 140–142°.

$\nu_{max.}^{CHCl_3}$: 1675 (amide C=O), 1590 (C=N), no amide II band

*Analysis.*—Calcd. for $C_{22}H_{25}ClN_4O$: N, 14.1. Found: N, 13.6.

EXAMPLES 11

*2-phenyl-3-[5-(4-phenyl-1-piperazyl)pentyl]-4-quinazolene*

A mixture of 2-phenyl-4-oxo-3,1,4-H-benzoxazine (33.5 g., 0.15 mole) and 4-phenyl-1-(5-aminopentyl)piperazine (37.1 g., 0.15 mole) was heated in a wax bath at 220–225° for two hours. On cooling the free base was dissolved in methanol and ethyl acetate and an ether solution of oxalic acid (18 g., 0.2 mole) was added. The solid that formed was collected and recrystallized three times from an aqueous methanol-ether solution and once from an aqueous ethanol-ethyl acetate-ether solution, yield 7.3 g. (0.9%), M.P. 184–186° (dec.).

*Analysis.*—Calcd. for $C_{29}H_{32}N_4O \cdot C_2H_2O_4$: N, 10.33; N (basic), 2.58. Found: N, 10.38; N (basic), 2.62.

EXAMPLE 12

*2-phenyl-3-[4-(4-phenyl-1-piperazyl)butyl]-4-quinazolone*

A mixture of 2-phenyl-4-oxo-3,1,4-H-benzoxazine (33.5 g., 0.15 mole) and 4-phenyl-1-(4-aminobutyl)piperazine (35 g., 0.15 mole) was heated in a wax bath at 210–220° for 3 hours. The free base was dissolved in hot methanol and an ether solution of oxalic acid (15.3 g., 0.17 mole) was added. The solid oxalate was collected and recrystallized from an aqueous methanol-ethyl acetate-ether solution, yield 36.4 g. (46%), M.P. 200–201.5° (dec.).

*Analysis.*—Calcd. for $C_{28}H_{30}N_4O \cdot C_2H_2O_4$: N, 10.61; N (basic), 5:30. Found: N, 10.66; N (basic), 5.21.

EXAMPLE 13

*2-phenyl-6-chloro-3-[3-(4-phenyl-1-piperazyl)propyl]-4-quinazolone*

A. A suspension of 4-phenyl-1-[3-(2-amino-5-chlorobenzamido)propyl]-piperazine (52 g., 0.14 mole) in 500 ml. of chloroform was cooled in an ice bath and benzoyl chloride (19.8 g., 0.14 mole) in 50 ml. of chloroform was added dropwise with stirring. The stirring in the cold was continued for an additional hour and the layers were separated. The chloroform layer was concentrated in vacuo to a white solid, which was twice recrystallized from a benzene-Skelly "B" solution. Yield 43.8 g. (65.5%), M.P. 199.5–200.5°

*Analysis.*—Calcd. for $C_{27}H_{29}ClN_4O_2$: N, 11.75. Found: N, 11.37.

B. A solution of 4-phenyl-1-[3-(2-benzamido-5-chlorobenzamido)propyl]-piperazine (43.8 g., 0.092 mole) in 250 ml. of acetic anhydride was heated under reflux for 16 hours. The solvent was removed in vacuo to leave a black concentrate. This concentrate was crystallized from an aqueous acetone solution. This brown solid was dissolved in a hot methanol-ethyl acetate solution and a methanol-ether solution of maleic acid (11.6 g., 0.1 mole) was added. The crystalline maleate was collected, washed with ether and dried. Yield 20.7 g. (39.2%), M.P. 204–205.5° (dec.).

*Analysis.*—Calcd. for $C_{27}H_{27}ClN_4O \cdot C_4H_4O_4$: N, 9.75; C, 64.75; H, 5.40. Found: N, 9.47; C, 64.35; H, 5.45.

EXAMPLE 14

*2-methyl-3-[3-(4-phenyl-1-piperazyl)propyl]-7-chloro-4-quinazolone*

To 10 grams (0.052 mole) of 2-methyl-4-oxo-6-chloro-3,1-4(H)-benzoxazine was added 11.4 grams (0.052 mole) of 4-phenyl-1-(3-aminophenyl)-piperazine and the mixture was heated in a wax bath for 3 hours at 210–220°. The reaction mixture was then cooled and the residue was dissolved in methanol. Crystallization occurred upon addition of Skelly "B." The precipitate was filtered and recrystallized from a chloroform Skelly "B" solution, giving 10.5 g. (50%) of material, melting at 136–138°.

*Analysis.*—Calcd. for $C_{22}H_{25}N_4OCl$: N (total), 14.11. Found: N (total), 13.80.

The infrared spectrum had two strong bands at 6μ and 6.25μ, but no band at 6.5μ indicated that the product was cyclic. The oxalate was prepared by 2.4 g. (0.027 mole) oxalic acid in anhydrous ether to a methanol solution of the free base. The precipitate was filtered and recrystallized from an aqueous methanol-ether solution. Yield 7.2 g., M.P. 210–212°.

*Analysis.*—Calcd. for $C_{24}H_{29}ClO_6N_4$: N (total), 11.10; C, 57.08; H, 5.80. Found: N (total), 10.93; C, 57.29; H, 6.30.

EXAMPLE 15

*2-methyl-3-[3-(4-p-chlorophenyl-1-piperazyl)propyl]-7-chloro-4-quinazlone*

To 10 g. (0.05 mole) of 2-methyl-4-oxo-6-chloro-3,1,4(H)-benzoxazine was added 12.7 g. (0.05 mole) of p-chloro-4-phenyl-1-(3-aminopropyl)-piperazine and the reaction mixture was heated in a wax bath at 200–210° for 3 hours. The melt was cooled and dissolved in methanol. A solid immediately precipitated which was filtered and recrystallized from a benzene-methanol solution. Yield 17 g. (78%), M.P. 128–130°.

The maleate salt was prepared by dissolving 10 grams of the free base in 20 ml. of absolute methanol and adding 2.32 g. (0.02 mole) of maleic acid to the solution. A little ether was added to the mixture and a white precipitate was obtained. It was recrystallized from methanol. Yield 8.5 g., M.P. 218–219°.

*Analysis.*—Calcd. for $C_{26}H_{29}N_4Cl_2O_5$: N (total), 10.22. Found: N (total), 10.23.

EXAMPLE 16

*2-phenyl-3-[3-(4-phenyl-1-piperazyl)propyl]-4-quinazolone*

A solution of 4-phenyl-1-[3-(2-benzamidobenzamido)propyl]-4-piperazine (15.5 g., 0.046 mole) in 50 ml. of acetic anhydride was refluxed for 8.5 hours to give a clear solution. The solvent was removed in vacuo and the residue (dark brown oil) was treated with cold sodium hydroxide solution to give a gum which gradually solidified on scratching, yield 8.9 g., M.P. 134–141°, after recrystallizing from aqueous DMF. The crude solid was suspended in ether and treated with maleic acid (2.45 g.) to give a powder. It was once recrystallized from aqueous methanol-ether to give a colorless crystalline maleate of M.P. 193–194°, yield 9.4 g.

*Analysis.*—Calcd. for $C_{27}H_{28}N_4O \cdot C_4H_4O_4$: N, 10.4. Found: N, 10.3.

A part of maleate was dissolved in hot aqueous methanol and made basic with sodium hydroxide solution to give a colorless solid of M.P. 140–141°. It was once recrystallized from aqueous DMF to give a light tan crystalline solid of M.P. 141–142°.

$\lambda_{max.}^{CHCl_3}$: 5.96μ (amide C=O)

*Analysis.*—Calcd. for $C_{27}H_{28}N_4O$: N, 13.2. Found: N, 13.3.

EXAMPLE 17

2-phenyl-3-[2-(4-phenyl-1-piperazyl)ethyl]-4-quinazolone

A mixture of 2-phenyl-4-oxo-3,1,4H-benzoxazine (22.3 g., 0.1 mole) and 4-phenyl-1-(2-aminoethyl)piperazine (20.5 g., 0.1 mole) was heated in a wax bath at 200–215° for 3 hours. The solid material obtained on cooling was dissolved in DMF, treated with Nuchar, filtered and the filtrate was diluted with water to form a viscous material that solidified on cooling. The solid was recrystallized from an aqueous acetone solution, yield 34.1 g. (83%), M.P. 147–148.5°.

*Analysis.*—Calcd. for $C_{26}H_{26}N_4O$: N, 13.7; N (basic), 3.41. Found: N, 13.8; N (basic), 3.39 (titration).

The maleate salt was prepared by adding a 2-propanol solution of maleic acid (12 g., 0.1 mole) to an ethyl acetate-ether solution of the free base (34 g., 0.115 mole). The solid salt was collected and recrystallized from an aqueous methanol solution, yield 35.8 g. (82%), M.P. 207–208° (dec.).

*Analysis.*—Calcd. for $C_{26}H_{26}N_4O \cdot C_4H_4O_4$: N, 10.65. Found: N, 10.62.

EXAMPLE 18

2-phenyl-3-[3-(4-p-chlorophenyl-1-piperazyl)propyl]-4-quinazolone

A mixture of 2-phenyl-4-oxo-3,1,4H-benzoxazine (22.3 g., 0.1 mole) and 4-(4-chlorophenyl)-1-(3-aminopropyl)piperazine (25.4 g., 0.1 mole) was heated in a wax bath at 210–220° for 3 hours. The material was dissolved in hot acetone, treated with Nuchar, filtered, and diluted with water to form a solid free base. This solid was recrystallized from methanol. Yield 30 g. (65.5%), M.P. 115.5–117°.

*Analysis.*—Calcd. for $C_{27}H_{27}ClN_4O$: N, 12.21. Found: N, 12.46.

The maleate was prepared by adding a methanol solution of maleic acid (12 g., 0.1 mole) to an ethyl acetate solution of the free base (30 g., 0.088 mole). The solid was collected and recrystallized from a methanol-ethyl acetate-ether solution. Yield 15 g. (40%), M.P. 189–191° (dec.).

*Analysis.*—Calcd. for $C_{27}H_{27}ClN_4O$: N, 9.75. Found: N, 9.67.

EXAMPLE 19

2-phenyl-3-[3-(4-phenyl-1-piperidyl)propyl]-4-quinazolone

A mixture of 2-phenyl-4-oxo-3,1,4H-benzoxazine (22.3 g., 0.1 mole) and 4-phenyl-1-(3-aminopropyl)piperidine (21.8 g., 0.1 mole) was heated in a wax bath at 210–220° for 3 hours. The free base could not be made to solidify, so the salt will be made directly. The free base was dissolved in ethyl acetate and a methanol solution of maleic acid was added. The solid salt was twice recrystallized from an aqueous methanol-ethyl acetate-ether solution, yield 14.4 g. (42.5%), M.P. 205–206° (dec.).

*Analysis.*—Calcd. for $C_{28}H_{29}N_3O \cdot C_4H_4O_4$: N, 7.79. Found: N, 7.98, 7.92.

EXAMPLE 20

4-hydroxy-4-phenyl-1-(2-cyanoethyl)piperazine

A. A mixture of 4-hydroxy-4-phenyl-1-piperidine (20 g., 0.113 mole) and acrylonitrile (6 g., 0.113 mole) was heated on the steam bath for 5 hours. The hot liquid was poured into cold Skelly "B" with stirring to form a white solid. This solid was collected, washed with Skelly "B" and dried. Yield 25.4 g. (97.5%), M.P. 87–89°.

*Analysis.*—Calcd. for $C_{14}H_{18}N_2O$: N, 12.17. Found: N, 12.48.

4-hydroxy-4-phenyl-1-(3-aminopropyl)piperidine

B. The reduction of 4-hydroxy-4-phenyl-1-(2-cyanoethyl)piperidine (25.4 g., 0.11 mole) ca. 1000 lbs., 100° C., methanol, saturated with ammonia and using a Raney nickel catalyst. The catalyst was removed by filtration and the filtrate was concentrated in vacuo and distilled, B.P. 160–168° (0.10 mm.), yield 21.0 g., (83.7%).

*Analysis.*—Calcd. for $C_{14}H_{22}N_2O$: N, 11.97. Found: N, 12.11.

2-phenyl-3-[3-(4-hydroxy-4-phenyl-1-piperidyl)propyl]-4-quinazolone

C. A mixture of 2-phenyl-4-oxo-3,1,4H-benzoxazine (20.4 g., 0.09 mole) and 4-hydroxy-4-phenyl-1-(3-aminopropyl)piperidine (21.4 g., 0.09 mole) was heated in a wax bath at 210–220° for 3 hours. The residue was dissolved in hot DMF, treated with Nuchar, filtered and diluted with water to form a white solid. The solid was twice recrystallized from an aqueous acetone solution. Yield 32.2 g. (78%), M.P. 96° (softens at 86°).

*Analysis.*—Calcd. for $C_{28}H_{29}N_3O_2$: N, 9.57. Found: N, 9.52.

An ether solution of oxalic acid (5 g., 0.055 mole) was added to a 2-propanol-ether solution of the free base (19 g., 0.043 mole). The solid that formed was collected and twice recrystallized from a 2-propanol-abs. ethanol-ether solution. Yield 19 g. (83%), M.P. 112.5–115° (dec.).

*Analysis.*—Calcd. for $C_{28}H_{29}N_3O_2 \cdot C_2H_2O_4$: N, 7.94. Found: N, 7.90.

EXAMPLE 21

2-phenyl-3-[3-(4-m-chlorophenyl-1-piperazyl)propyl]-4-quinazolone maleate

A mixture of 2-phenyl-4-oxo-3,1,4H-benzoxazine (22 g., 0.098 mole) and 4-(3-chlorophenyl)-1-(3-aminopropyl)piperazine (25 g., 0.098 mole) was heated in a wax bath at 210–220° for 1 hour. The reaction product was dissolved in hot DMF, treated with Nuchar, filtered and the filtrate was diluted with water to form a sticky oil. The liquid was decanted and the oil was dissolved in hot 2-propanol-ethyl acetate and an ethyl acetate-ether solution of maleic acid (13 g., 0.112 mole) was added. The solid salt that formed was collected and recrystallized from a methanol ether solution. Yield 29.7 g. (52.7%), M.P. 185–187° (dec.).

*Analysis.*—Calcd. for $C_{27}H_{27}ClN_4O \cdot C_4H_4O_4$: C, 64.8; H, 5.39; N, 9.75. Found: C, 64.9; H, 5.66; N, 9.78.

In summary, this invention provides a series of novel quinazolone derivatives as above defined. These compounds in the form of various non-toxic salts are useful as sedative and anti-inflammatory agents.

These compounds may be conveniently prepared by reacting a benzoxazine with the appropriate amine or stepwise by reacting the appropriate aromatic amine with an acylating agent and then cyclizing the resulting amide, as shown in Examples 10, 13 and 16.

What is claimed is:

1. 2-methyl-3 - [3 - (4-phenyl-1-piperazyl)propyl] - 4-quinazolone.
2. 2-methyl-3-[6-(4-phenyl - 1 - piperazyl)hexyl] - 4-quinazolone.
3. 2 - methyl - 3-[3-(4-p - tolyl-1-piperazyl)propyl]-4-quinazolone.
4. 2-methyl - 3 - [3-(4 - p-tolyl-1-piperazyl)propyl]-4-quinazolone methiodide.
5. 2-phenyl-3-[2-(4 - phenyl - 1 - piperazyl)ethyl]-4-quinazolone.
6. 2-methyl-3-[3-(4 - p-chlorophenyl-1-piperazyl)propyl]-7-chloro-4-quinazolone.
7. 2 - phenyl - 3 - [3-(4-phenyl-1-piperidyl)propyl]-4-quinazolone.
8. 2-phenyl-3-[3-(4-hydroxy - 4 - phenyl-1-piperidyl)propyl]-4-quinazolone.
9. 2-phenyl-3-[3-(4 - phenyl - 1 - piperazyl)propyl]-6-chloro-4-quinazolone.

10. A compound selected from the group consisting of compounds of the formula:

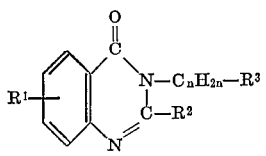

wherein $R^1$ is a member selected from the group consisting of hydrogen and chloro, $R^2$ is a member selected from the group consisting of hydrogen, methyl and phenyl, $n$ is a number from 0 to 7 and $R^3$ is a member selected from the group consisting of 4-phenyl-1-piperazyl, 4-substituted phenyl-1-piperazyl, 4-phenyl-1-piperidyl and 4-substituted phenyl-1-piperidyl, wherein the substituents are selected from the group consisting of chloro, methyl and hydroxyl and water soluble non-toxic acid addition salts thereof.

References Cited by the Examiner

UNITED STATES PATENTS

| | | | |
|---|---|---|---|
| 3,047,462 | 7/1962 | Maillard | 260—256.4 |
| 3,073,826 | 1/1963 | Scarborough | 260—256.4 |
| 3,086,910 | 4/1963 | Shetty | 260—256.4 |

NICHOLAS S. RIZZO, *Primary Examiner.*